United States Patent
Kasprzyk et al.

(10) Patent No.: US 6,659,015 B2
(45) Date of Patent: Dec. 9, 2003

(54) IDLER WHEEL ARRANGEMENT FOR RAIL VEHICLES

(75) Inventors: Thaddäus Kasprzyk, Dorsten (DE); Thomas Timmermann, Ratingen (DE); Bernd Wienkopf, Bochum (DE)

(73) Assignee: Gutehoffnugshutte Radsatz GmbH, Oberhaussen (DE)

( * ) Notice: Subject to any disclaimer, the term of this patent is extended or adjusted under 35 U.S.C. 154(b) by 0 days.

(21) Appl. No.: 10/141,042

(22) Filed: May 8, 2002

(65) Prior Publication Data

US 2002/0189490 A1 Dec. 19, 2002

(30) Foreign Application Priority Data

May 8, 2001 (DE) .......................... 101 22 185

(51) Int. Cl.[7] ............................... B61C 9/00
(52) U.S. Cl. ................................... 105/96
(58) Field of Search .................. 104/243; 105/72.1, 105/72.2, 73, 96

(56) References Cited

U.S. PATENT DOCUMENTS

| | | | | |
|---|---|---|---|---|
| 4,579,064 A | * | 4/1986 | Cawley | 105/215.1 |
| 5,753,987 A | * | 5/1998 | Shepherd et al. | 310/75 R |
| 5,904,102 A | | 5/1999 | Brinkmann et al. | |
| 6,324,994 B1 | * | 12/2001 | Glenn | 105/72.2 |
| 6,343,554 B1 | | 2/2002 | Affeldt et al. | |

FOREIGN PATENT DOCUMENTS

| | | |
|---|---|---|
| DE | 43 17 536 C1 | 9/1994 |
| DE | 196 50 913 A1 | 6/1998 |
| DE | 199 30 424 A1 | 1/2001 |
| EP | 0 943 519 A2 | 9/1999 |

* cited by examiner

Primary Examiner—S. Joseph Morano
Assistant Examiner—Robert J. McCarry, Jr.
(74) Attorney, Agent, or Firm—Brinks Hofer Gilson & Lione

(57) ABSTRACT

The invention relates to an idler wheel arrangement for rail vehicles, consisting of a wheel (2) rotatably mounted on an axle stub (4) of an axle (6), in particular of a cranked straddle axle, and having an inside (12) facing the axle (6) and an opposite outside (16) and of holding means for three functional devices, specifically for an earth-contact arrangement (18), a transmitter arrangement (20) of an anti-slip device and a braking device (22). The holding means having a carrier element (24) fixedly connected on the end face to the axle stub (4) on the outside (16) of the wheel (2). The carrier element (24) has reception means for fixed components (18a, 20a, 22a) of all three functional devices (18, 20, 22), the wheel (2) being assigned reception means for correspondingly associated components (18b, 20b, 22b), rotating with the wheel (2), of the three functional devices (18, 20, 22), in adaptation to the arrangement of the fixed components (18a, 20a, 22a).

14 Claims, 3 Drawing Sheets

IDLER WHEEL ARRANGEMENT FOR RAIL VEHICLES

The present invention relates to an idler wheel arrangement for rail vehicles, consisting of a wheel rotatably mounted on an axle stub of an axle. In particular, the axle is a rigid cranked straddle axle and the idler wheel having an inside facing the axle. and an opposite outside and holding means for three functional devices, specifically for an ground-contact arrangement, for a transmitter arrangement of an anti-slip device, and for a braking device.

BACKGROUND OF THE INVENTION

In idler wheel arrangements of the known type, up to three functional devices may be provided, depending on the particular application and in addition to drive means in the case of a driven version. These functional devices include an ground-contact arrangement, a transmitter arrangement of an anti-slip device (in the manner of an anti-lock system), and a braking device. The arrangement of these three functional devices has hitherto presented problems in the case of known idler wheel arrangements, in so far as at least one device has had to be arranged on the wheel inside for reasons of space. This has led to very poor accessibility, for exam le for maintenance and repair work.

The object on which the present invention is based is to provide an idler wheel arrangement of the type mentioned, in which the previously mentioned three functional devices can be arranged in a space-saving and conspicuous way and with markedly improved accessibility.

This is achieved, according to the invention, in that the holding means have a central carrier element fixedly connected on the end face to the axle stub on the outside of the wheel, the carrier element having reception means for fixed components of all three said functional devices, and the wheel being assigned reception means for correspondingly associated components, rotating with the wheel, of the three functional devices, in adaptation to the arrangement of the fixed components.

Via the central carrier element jointly assigned to all three functional devices, advantageously the fixed components of the functional devices can be arranged on the outside of the chassis in an easily accessible and clearly conspicuous way, thus leading to appreciable advantages in terms of assembly and of maintenance and repair work. Preferably, the same carrier element may be used for all the applications occurring in practice, in which case selectively at least one of the said functional devices, or, if appropriate, even none at all, may be mounted. This applies correspondingly to the fixed components and to the reception means, assigned to the wheel, for the respective rotating functional components.

Further advantageous design features of the invention are contained in the subclaims and the following description.

The invention will be explained in more detail with reference to a preferred exemplary embodiment illustrated in the drawing, in which:

DETAILED DESCRIPTION OF THE PREFERRED EMBODIMENT

Figure 1:
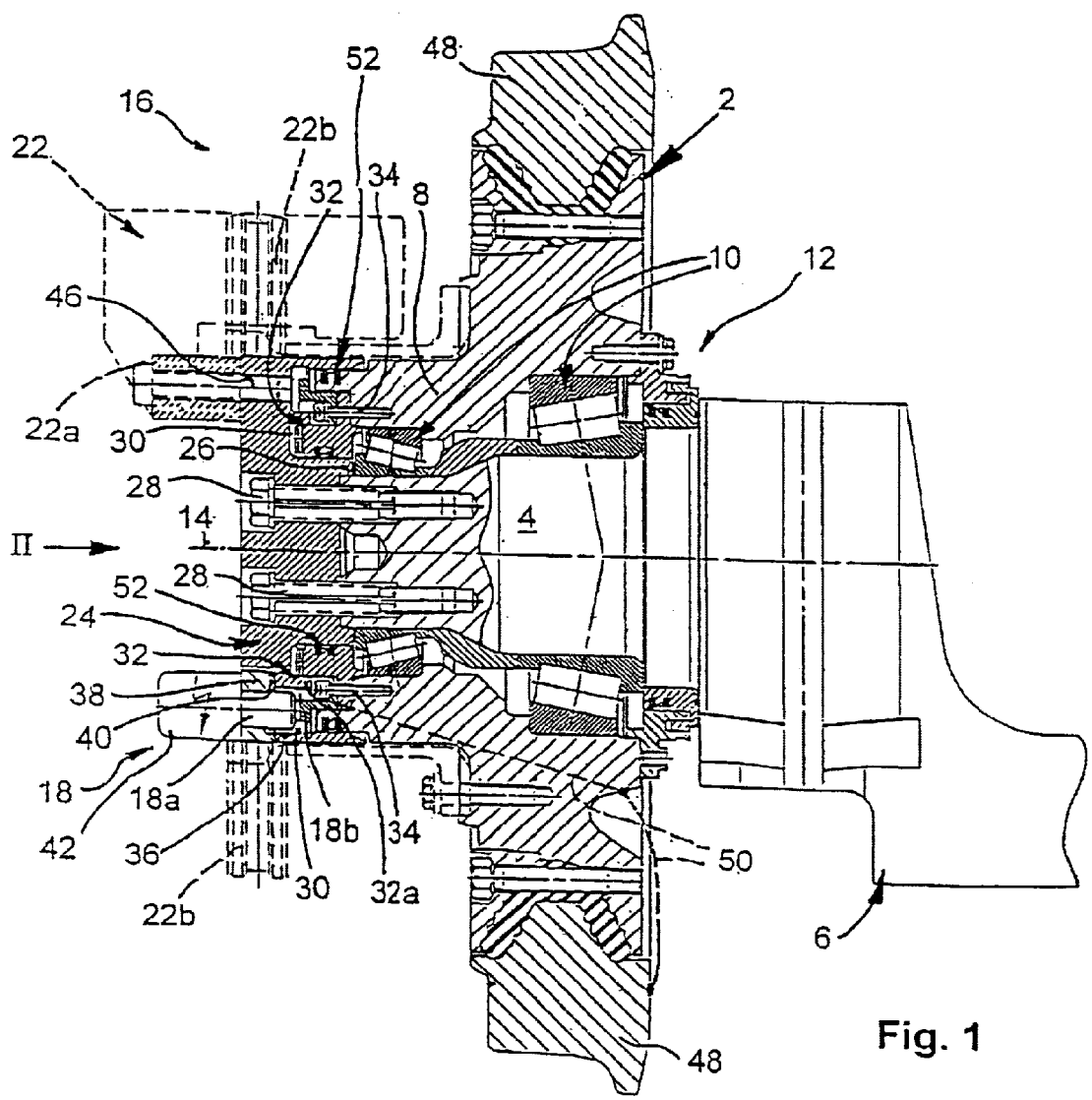
FIG. 1 shows a section through an idler wheel arrangement according to the invention in plane I—I according to FIG. 2.

Throughout this description, identical parts are given the same reference symbols in the various figures of the drawing.

As may first be gathered from FIG. 1, an idler wheel arrangement according to the invention has a wheel 2 which is rotatably mounted on an axle stub 4 of a rigid axle 6, in particular of a cranked straddle axle. For rotatable mounting, the wheel 2 is seated with a wheel hub 8 on the axle stub 4 via rotary bearings 10. To form an entire idler wheel axle, the axle 6, on its opposite side, not illustrated in FIG. 1, carries a corresponding wheel 2, via a further axle stub, in a mirror-symmetrical design. The wheel 2 has an inside 12 facing the axle 6 and an outside 16 which is axially opposite, that is to say in the direction of an axis of rotation 14. Moreover, the idler wheel arrangement has holding means for (at least) three functional devices, specifically for an ground-contact arrangement 18, a transmitter arrangement 20 (pulse transmitter) of an anti-slip device in the manner of an anti-lock system and also a braking device 22. The braking device 22 is merely indicated by broken lines in FIG. 1, and the transmitter arrangement 20 is mainly to be seen in FIG. 3.

According to the invention, a central carrier element 24 fixedly connected on the end face to the axle stub 4 on the outside 16 of the wheel 2 is provided as holding means. This carrier element 24 has reception means for fixed components including sliding contact 18a, pulse receiver 20a, brake caliper 22a, of all three functional devices 18, 20, and 22. In this case, the wheel 2 includes reception means for correspondingly associated components including slip ring 18b, transmitter ring 20b, brake disc 22b, rotating together with the wheel 2, of the three functional devices 18, 20, 22, in adaptation to the arrangement of the fixed components 18a, 20a, 22a.

In the preferred embodiment illustrated, the carrier element 24 is designed essentially in the form of a circular disc and is arranged perpendicularly and, in particular, coaxially to the axis of rotation 14 of the wheel 2. At the same time, the carrier element 24 is rigidly connected, in particular screwed, pinned and/or pressed on, directly to the axle stub 4. In the example illustrated, the carrier element 24 is seated in a self-centering manner with an axial circumferential annular collar 26, free of play, on the end face of the axle stub 4 and is held via, for example, four axially parallel screws 28, in that the screws 28 extend through passage holes of the carrier element 24 into threaded bores of the axle stub 4. The screws 28 are seated with their heads, in particular hexagonal heads, preferably countersunk, in depressions of the carrier element 24.

Figure 3:
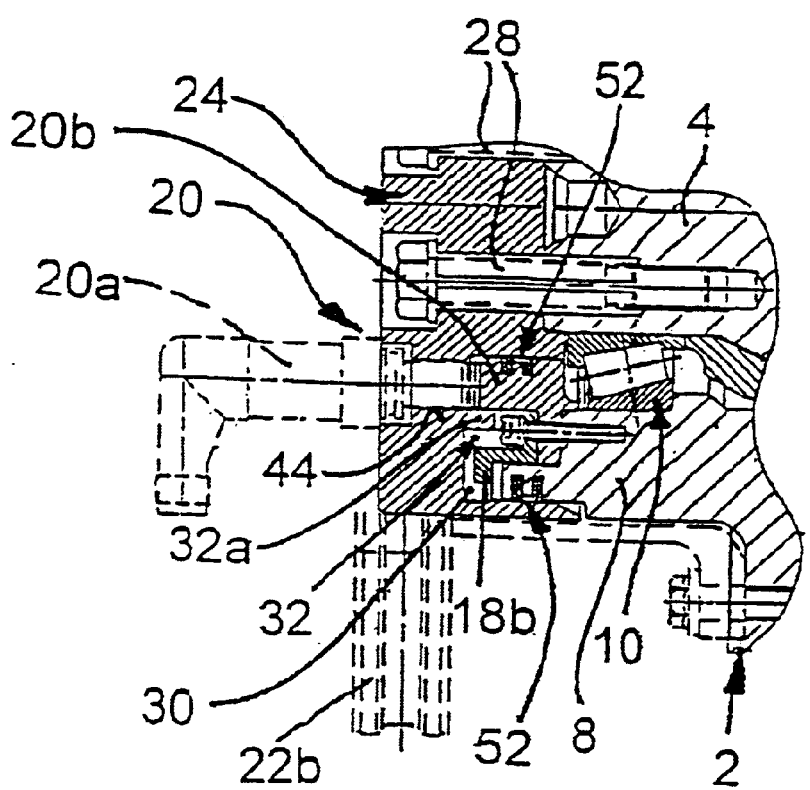
FIG. 3 shows a part-section in the plane III according to FIG. 2.

According to FIGS. 1 and 3, between the carrier element 24 and the wheel hub 8, an annular-duct-like, coaxial and, in particular, outwardly sealed-off reception space 30 is formed, which serves for receiving a slip ring 18b, to be connected as a rotating component of the ground-contact arrangement 18 to the wheel hub 8, and/or a transmitter ring 20b, to be connected as a rotating component of the transmitter arrangement 20 to the wheel hub 8. In the preferred exemplary embodiment illustrated, both said components 18b and 20b can be or are accommodated within the same reception space 30, and they are designed concentrically with different diameters. In this case, preferably, the reception space 30 is subdivided into two part-annular chambers via sealing means 32 in the manner of the labyrinth seal, as illustrated. The slip ring 18b and the transmitter ring 20b may advantageously be jointly connected to the wheel hub 8, for which purpose. In the example illustrated, they have flange-like mutually overlapping portions with passage holes, through which fastening screws 34 extend.

At least one sliding contact 18a can be fastened, as a fixed component of the ground-contact arrangement 18, to the carrier element 24. As illustrated, however, a plurality of, in particular four, sliding contacts 18a arranged so as to distributed over a specific circumferential angle are provided, which in each case interact with a radial plane surface of the slip ring 18b (see FIG. 1). The carrier element 24 has, as reception means for each of the sliding contacts 18a, an axially parallel mounting orifice 36 axially adjacent to the slip ring 18b in the region of the circumferential circle of the latter. Each sliding contact 18a is designed, for example, as a conventional carbon brush. Abrasion therefore necessarily arises in interaction with the slip ring 18b. Advantageously, however, the sealing means 32 prevents the situation where this abrasion may penetrate into the other part-chamber and therefore into the region of the transmitter arrangement 20. An annular-web extension 32a of the carrier element 24 projects as sealing means 32 axially into that region of the reception space 30 which is located approximately radially between the slip ring 18b and the transmitter ring 20b, in such a way that a labyrinth-like sealing gap is formed.

It is expedient, furthermore, if all the sliding contacts 18a are fastened on a common plate-shaped brush holder 38, whilst being capable of being fastened jointly to the carrier element 24 indirectly via the brush holder 38. According to FIG. 1, a seal 40 is located between the brush holder 38 and the carrier element 24. Moreover, the sliding contacts 18a may, in particular, be capable of being covered in pairs in each case by a cap-like cover 42.

As may be gathered from FIG. 3, a pulse receiver 20a can be fastened to a carrier element 24 in a region axially adjacent to the transmitter ring 20b. For this purpose, the carrier element 24 has as reception means for and, in particular, axially parallel mounting orifice 44 located in the region of the circumferential circle of the transmitter ring 20b (see, in this respect, also FIG. 2). The transmitter ring 20b is designed with means for the generation of rotation-induced pulses in interaction with the pulse receiver 20a, for example with a toothing or a perforation.

Figure 2:
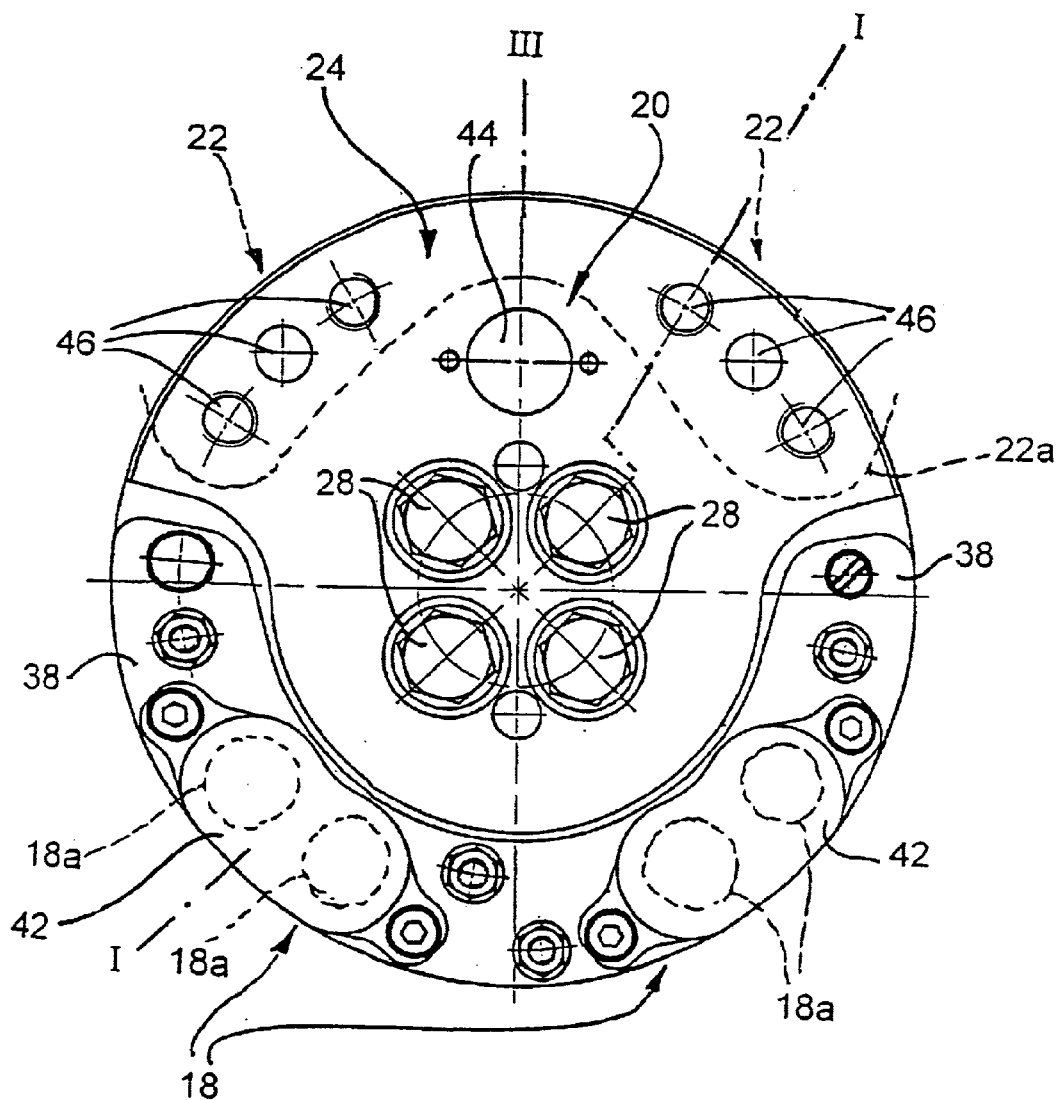
FIG. 2 shows an end view of the essential holding means in the direction of the arrow II according to FIG. 1.

Finally, the carrier element 24 has, as reception means for a fixed brake caliper 22a of the braking device 22 (see FIG. 1), holding orifices 46 in a specific circumferential region located outside the remaining reception means, see, in particular, FIG. 2. As a rotating component of the braking device 22, in particular, a brake disc 22b can be fastened to the wheel 2, the brake disc 22b running, according to FIG. 1, in the brake caliper 22a protecting radially from the carrier element 24. The brake disc 22b is designed as what is known as flanged brake disc which is fastened to the wheel 2 via a radial fastening flange, and the actual brake disc 22b is connected to the fastening flange via a hollow-cylindrical portion surrounding the wheel hub 8.

In a further advantageous embodiment, there is provision for the slip ring 18b to the directly connected electrically conductively, bypassing the rotary bearings 10 of the wheel 2, via a current path to the wheel 2 and to an, in particular, elastically mounted wheel tire 48. For this purpose, on the one hand, the rotary bearings 10 can be insulated electrically relative to the wheel 2 or the wheel hub 8. On the other hand, electrical lines 50, which are depicted merely by broken lines in FIG. 1, can run, insulated, from the slip ring 18b through bores of the wheel hub 8 and be connected to the wheel 2 and to the wheel tire 48.

It is advantageous, furthermore, if the rotating wheel 2 is sealed off inwardly and outwardly relative to the fixed carrier element 24 via a circumferential seal 52. In the preferred arrangement illustrated, the carrier element 24 is seated with an outer axial annular circumferential web on a hollow-cylindrical extension of the wheel hub 8, and between them is located a first circumferential seal consisting, for example, of two sealing rings. Furthermore, the carrier element 24 engages with an inner cylindrical extension into the transmitter ring 20b connected to the wheel 2, and between them is located a second seal likewise consisting, for example, of two sealing rings. It may additionally be noted, in this respect, that a radially reversed arrangement of the transmitter ring 20b and slip ring 18b is, of course, also possible, in which case the inner seal would be arranged between the carrier element 24 and the slip ring 18b.

Moreover, the slip ring 18b and/or the transmitter ring 20b may also be formed by annular-surface regions provided in one piece within the wheel hub 8.

Besides, the invention is in any case not restricted to the exemplary embodiment actually illustrated and described, but also embraces all embodiments acting identically within the meaning of the invention. Furthermore, the invention has hitherto also not yet been restricted to the feature combination defined in claim 1, but may also be defined by any other desired combination of specific features of all the individual features disclosed as a whole. This means that, in principle, practically any individual feature of claim 1 may be omitted or be replaced by at least one individual feature disclosed elsewhere in the application. To that extent, claim 1 is to be understood merely as a first attempt at the formulation of an invention.

While the above description constitutes the preferred embodiment of the present invention, it will be appreciated that the invention is susceptible to modification, variation and change without departing from the proper scope and fair meaning of the accompanying claims.

What is claimed is:

1. Idler wheel arrangement for rail vehicles, having a wheel rotatably mounted on an axle stub of an axle, said wheel having an inside facing the axle and an opposite outside and having holding means for functional devices including a ground-contact arrangement, a transmitter arrangement of an anti-slip device and a braking device, said holding means having a carrier element fixedly connected on the axle stub on the outside of the wheel, the carrier element having reception means for fixed components of said functional devices, and the wheel having reception means for rotating components of said functional devices, in adaptation to the arrangement of the fixed components.

2. An idler wheel arrangement according to claim 1, further comprising in that the carrier element is of essentially disc-shaped design and is arranged perpendicularly and coaxially to an axis of rotation of the wheel.

3. An idler wheel arrangement according to claim 1, further comprising in that the carrier element is rigidly connected directly to the axle stub.

4. An idler wheel arrangement according to claim 1, further comprising in that, between the carrier element and a wheel hub of the wheel, an annular-duct-like, coaxial and outwardly sealed-off reception space is formed, for the reception of a slip ring, to be connected as a rotating component of the ground-contact arrangement to the wheel hub, or a transmitter ring, to be connected as a rotating component of the transmitter arrangement to the wheel hub.

5. An idler wheel arrangement according to claim 4 further comprising in that the slip ring and the transmitter ring are accommodated jointly in the same reception space concentrically and with different diameters, and the reception space is subdivided by sealing means.

6. An idler wheel arrangement according to claim 4, further comprising in that the carrier element has, as reception means for a fixed pulse receiver of the transmitter arrangement, an axially parallel mounting orifice axially adjacent to the transmitter ring.

7. An idler wheel arrangement according to claim 4, further comprising in that the carrier element has, as reception means for at least one fixed sliding contact of the ground-contact arrangement, at least one axially parallel mounting orifice axially to the slip ring.

8. An idler wheel arrangement according to claim 7, further comprising in that the carrier element has a plurality of mounting orifices, arranged so as to be distributed over a specific circumferential angle, for a plurality of sliding contacts.

9. An idler wheel arrangement according to claim 7, further comprising at least one releasably fastenable cap-like sliding-contact cover, covering at least two sliding contacts.

10. An idler wheel arrangement according to claim 1, further comprising in that the carrier element has, as reception means for a fixed brake caliper of the braking device, and further including axially parallel holding orifices in a specific circumferential region located outside the remaining reception means.

11. An idler wheel arrangement according to claim 10, further comprising in that, as a rotating component of the braking device, a brake disc is fastened to the wheel, the brake disc running in the brake caliper projecting radially from the carrier element.

12. An idler wheel arrangement according to claim 4, further comprising in that the slip ring is directly connected electrically conductively, bypassing a rotary mounting of the wheel, via a current path to the wheel and to an elastically mounted wheel tire.

13. An idler wheel arrangement according to claim 1, further comprising in that the rotating wheel is sealed off relative to the fixed carrier element via a circumferential seal.

14. An idler wheel arrangement according to claim 1, further comprising in that the carrier element is connected in a self-centering manner to the axle stub, for which purpose the carrier element is seated with an axial circumferential annular collar, free of play, on the end face of the axle stub.

* * * * *

UNITED STATES PATENT AND TRADEMARK OFFICE
CERTIFICATE OF CORRECTION

PATENT NO.    : 6,659,015 B2                                               Page 1 of 1
DATED         : December 9, 2003
INVENTOR(S)   : Thaddaus Kasprzyk, Thomas Timmermann and Brend Wienkopf It is certified that error appears in the above-identified patent and that said Letters Patent is hereby corrected as shown below:

Column 5,
Line 11, after "one" delete "fixed".

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,659,015 B2  
DATED : December 9, 2003  
INVENTOR(S) : Thaddäus Kasprzyk, Thomas Timmermann and Bernd Wienkop It is certified that error appears in the above-identified patent and that said Letters Patent is hereby corrected as shown below:

<u>Title page,</u>  
Item [75], Inventors, reads "Wienkopf" should read -- Wienkop --.  
Item [73], Assignee, reads "Gutehoffnugshutte Radsatz GmbH, Oberhaussen" should read -- Gutenhoffnungshütte Radsatz GmbH, Oberhausen -- .

Signed and Sealed this

Twenty-ninth Day of June, 2004

JON W. DUDAS  
*Acting Director of the United States Patent and Trademark Office*